Figure 5:
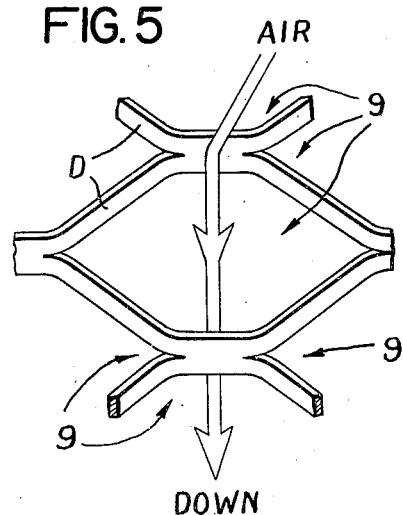
Figure 6:
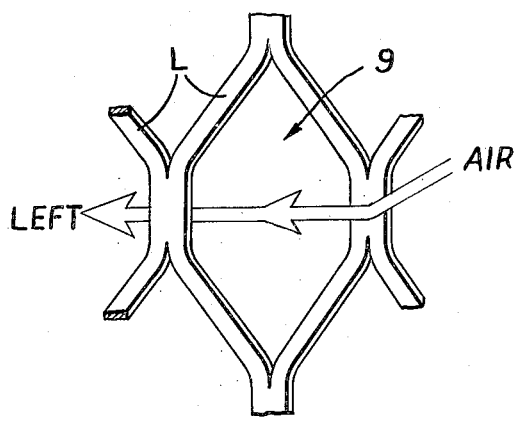
Figure 7:
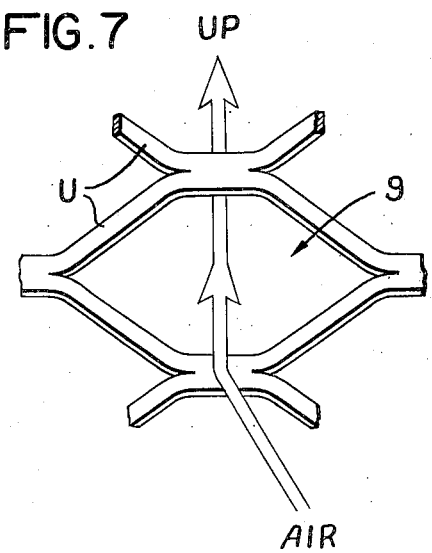
Figure 8:
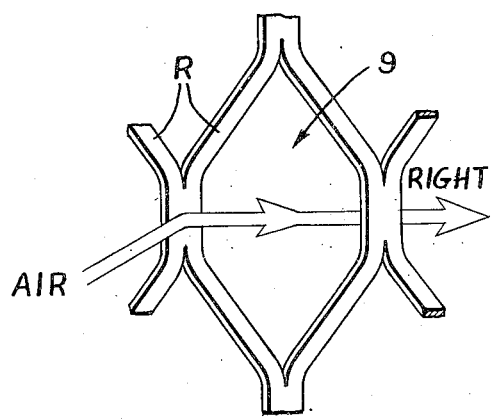
Figure 9:
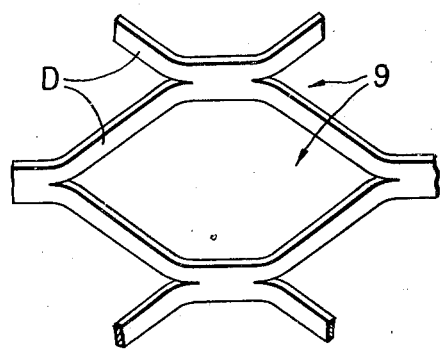

Jan. 3, 1950 C. N. O'DAY 2,493,726
AIR FILTERING MEDIA
Filed June 5, 1947 5 Sheets-Sheet 1
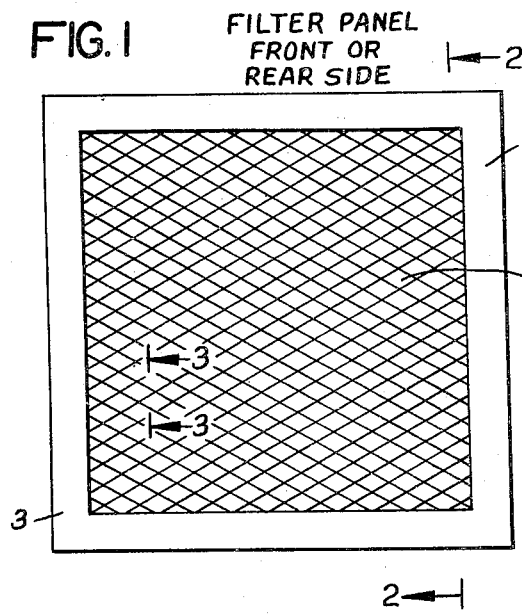
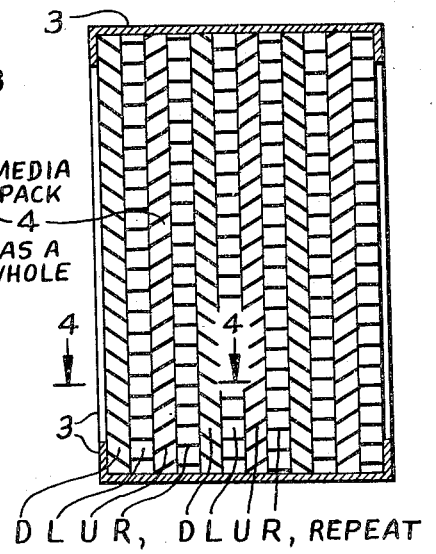
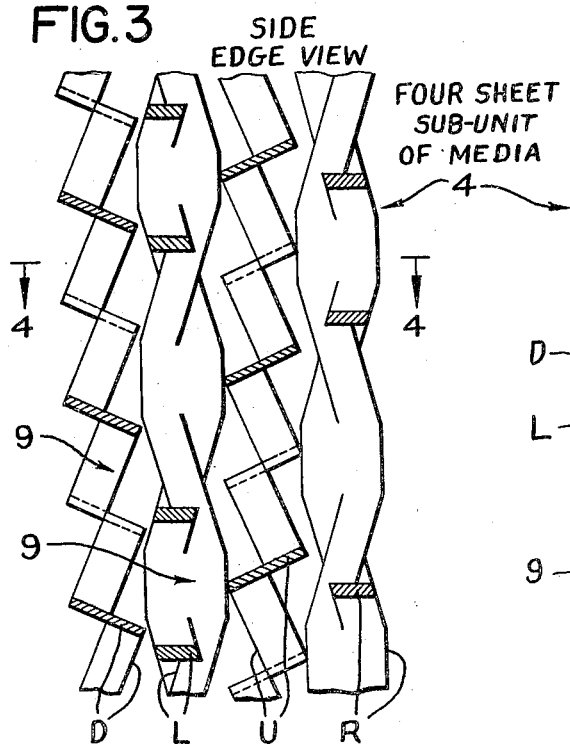
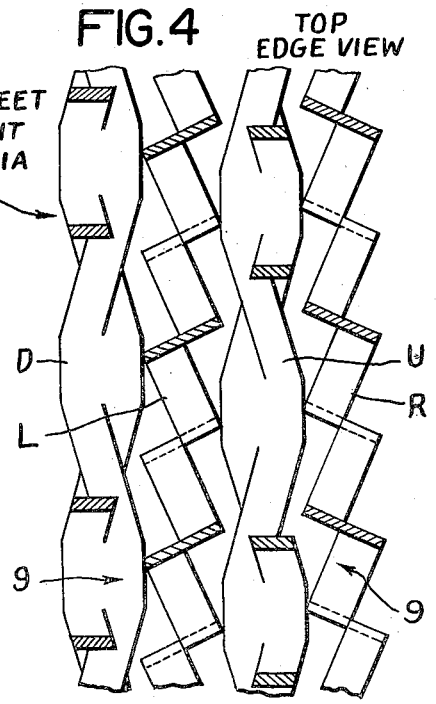
INVENTOR
CORTLAND N. O'DAY
BY
James C. Ledbetter
ATTORNEY Jan. 3, 1950 C. N. O'DAY 2,493,726
AIR FILTERING MEDIA
Filed June 5, 1947 5 Sheets-Sheet 2

INVENTOR,
CORTLAND N. O'DAY
BY
James C. Ledbetter
ATTORNEY

FOUR SHEET SUB-UNIT OF MEDIA

INVENTOR,
CORTLAND N. O'DAY
BY
James C. Ledbetter
ATTORNEY

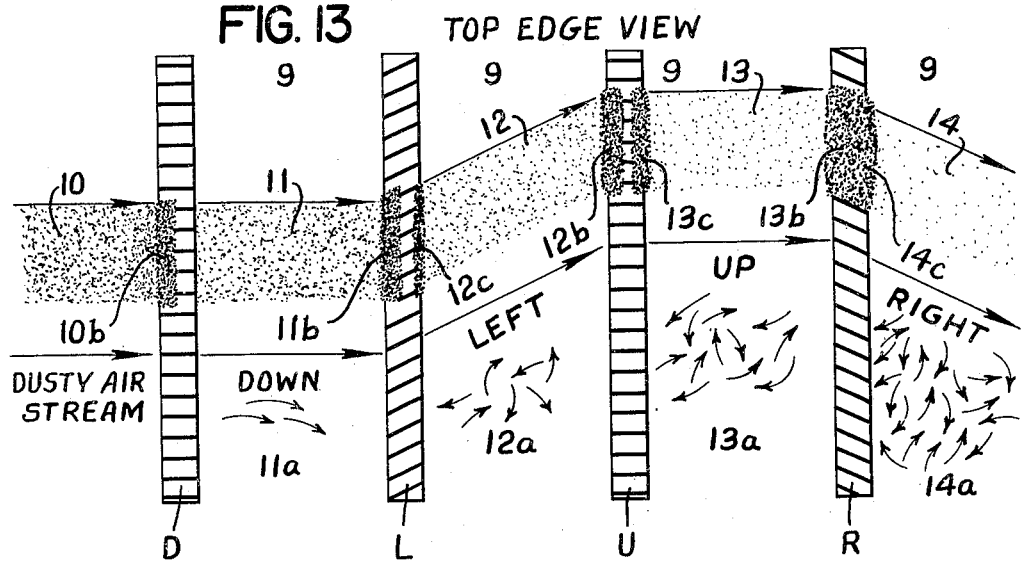
MEDIA SHEETS SPACED TO AID DESCRIPTION,
SHOW AIR MIXING, AND REAR-SURFACE LOADING
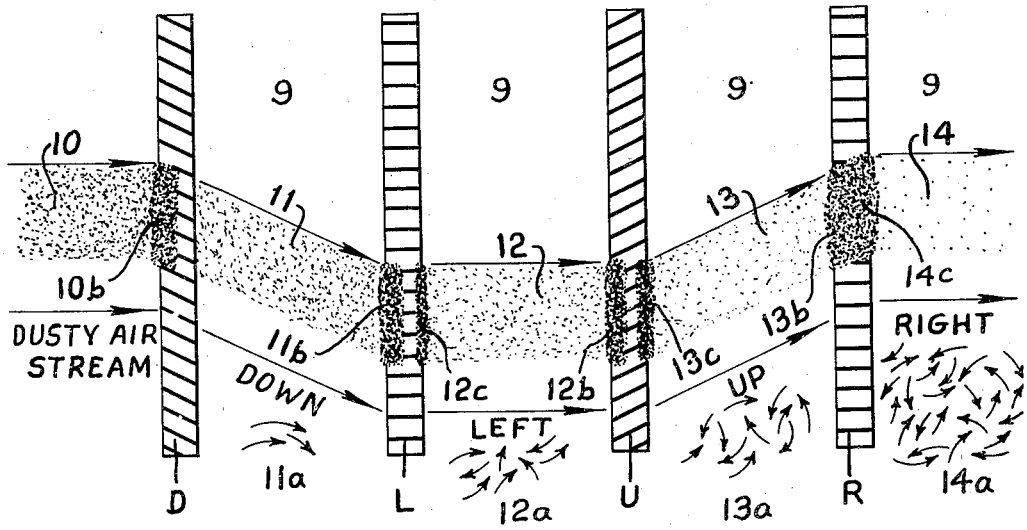
a FOR AIR MIXING
b FOR AGGLOMERATE ON FRONT
c FOR AGGLOMERATE ON REAR
INVENTOR.
CORTLAND N. O'DAY
BY
James C. Ledbetter
ATTORNEY

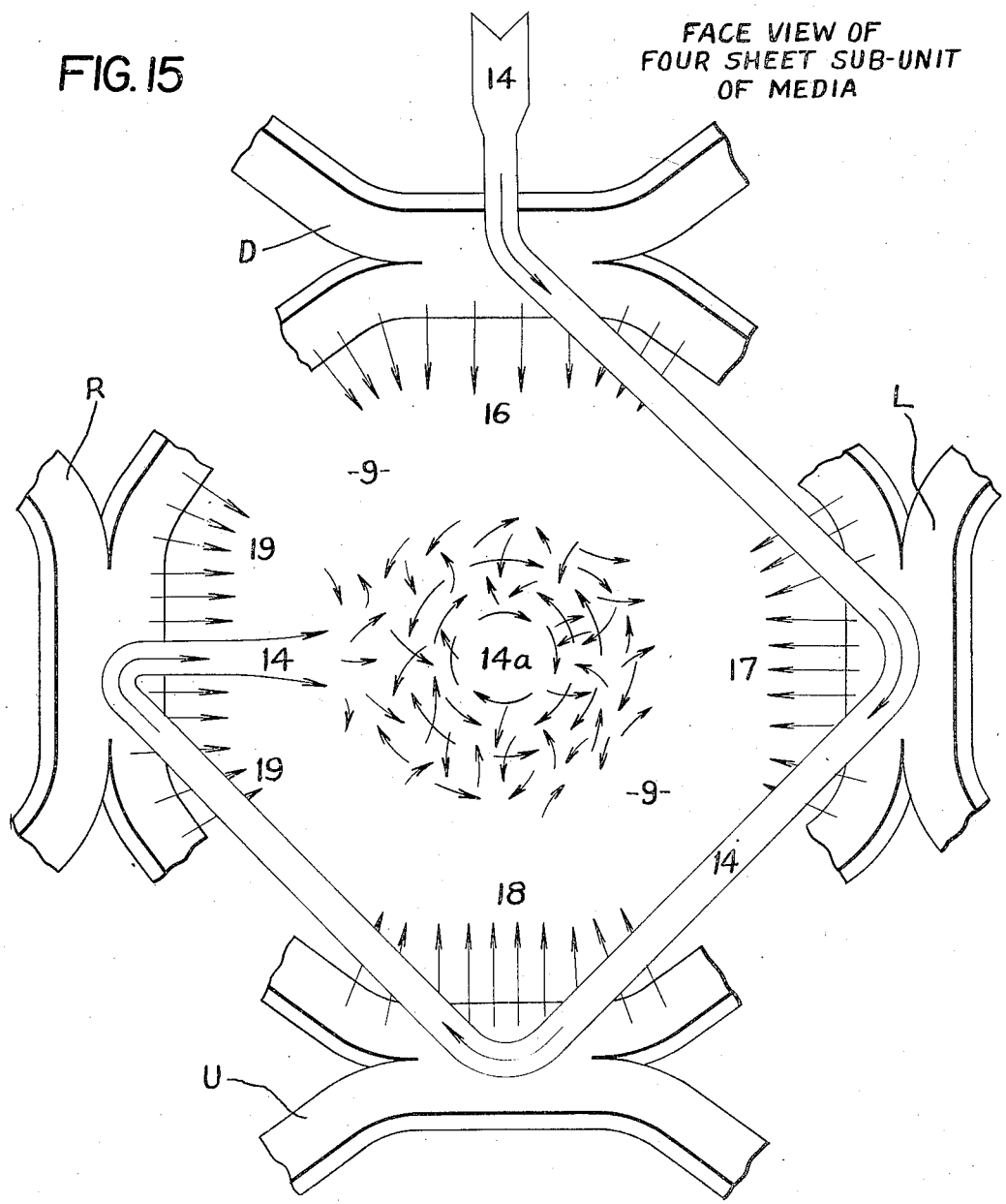

Patented Jan. 3, 1950

2,493,726

UNITED STATES PATENT OFFICE 2,493,726

AIR FILTERING MEDIA

Cortland N. O'Day, Port Washington, N. Y., assignor to Air Devices, Inc., New York, N. Y., a corporation of New York Application June 5, 1947, Serial No. 752,655

3 Claims. (Cl. 183—70)

This invention relates to filters and particularly to a new air filtering media of high efficiency with a long serviceable life for use in producing what is known in the art as the wet or viscous type air filters.

Generally speaking, a filter "media" as such is the active or working portion of an air filter which extracts foreign matter (dust, dirt, lint, soil and other particles) from an air stream passing therethrough. Conventional media is made of one or more layers of foraminous sheets of various forms and materials either placed contiguously with each other, or in closely spaced relation, and held in a retaining frame to form a "filter panel" adapted to be removably installed in the duct of an air conditioning system.

One conventional air filtering media, known as the dry type for filtering dust from an air stream, is made of cloth, paper, cotton, fibrous or other screening or strainer-like sheet material which is used in a dry condition. Its sheeting is foraminated with fine perforations or interstices of smaller porosity than the size of dust and other foreign particles intended to be filtered from the air and operates simply on the principle of a screen or strainer. Such a media may comprise one or many dry sheets through which the dusty air stream is forced.

The foregoing dry type screen or strainer-like filter has the disadvantage of requiring frequent servicing (cleaning and repairing) due to the extremely fine porosity of its sheet or sheets which causes premature loading on the front or inlet surface or surfaces and the plugging of its minute porosity with dust strained from the air. Thus clogged and loaded on its front surface area, the dry screen-strainer media causes resistance to or stoppage of the air flow, resulting in maximum power consumption (usually electric) to drive the blowers which propel the dusty air stream through an air distributing system equipped with such screen type dry filters of fine porosity. It is inefficient and has a short serviceable life. On the other hand, it has the advantage of maximum cleaning of the air because of its fine porosity.

A second conventional form of air filter is the wet or viscous media of several known types. Its metallic, fibrous, paper or other material, comprising a stack or mat of packed sheets, is reticulated with coarsely formed open net-work perforations constituting tortuous air passages which are excessively larger in size than the foreign particles intended to be filtered from the air. As known in the art, this wet type media is dipped in or spray coated with oil or other suitable saturant constituting a viscous or adhesive element (usually liquid) forming a tacky media surface which is adapted to extract and arrest dust from the air by impingement, that is, either by adherence, by adsorption or absorption, and including a capillary or a wicking action when the dust comes into contact with and attaches itself to the front side inlet surfaces of the viscous or adhesive media.

The adhering dust particles, by the absorption or wicking action above explained, become in themselves wetted and by capillarity present a freshly formed viscous surface to subsequent dust particles which impinge, cling and load on the front surfaces and sides of the stacked open-work sheets of conventional media. This action constantly presents freshly viscous surfaces to the dust laden air stream and continues to the limit of the absorptive, capillary or wicking action of the viscous element, that is, until the front surfaces and edges of the filter media become dry, or non-adhesive, or until the build-up of deposited smug or oil-wetted dust (known as agglomerate) closes the coarse air passages of the open-work media so that it no longer functions.

The foregoing second-mentioned conventional filter media of large size perforations (viscous type) has the disadvantage of minimum of dust arrestance and retention. This is due to the fact that a percentage of the dust fails to impinge the viscous front surfaces and thus escapes through the coarse media and contaminates the air previously cleaned by impingement with said media surfaces. On the other hand, the coarse viscous media has the advantage of maximum and comparatively free air flow, due to its coarse open-work air passages, and hence a low power consumption but, nevertheless, a correspondingly low efficiency. After such viscous type media has dried up, its saturant spent, and it is loaded with agglomerate, the filter is serviced, that is, removed from its air duct or conduit, and cleaned, recoated with a viscous element, and again placed in use.

A third species of the above noted conventional filter media is known as the progressive or graduated-density type. It is a viscous media, the front side or air inlet zone of which has coarsely formed open-work air passages which either gradually or in stages reduce differentially in size toward the rear side or air outlet zone of the media until a fine-size porosity is provided. The larger dust particles are intended to be extracted from the air by impingement on the front surfaces of the coarse passages in the inlet zone and the finer dust trapped by the fine-size porosity in the outlet zone of the filter.

The chief disadvantage of the graduated-density filter (combining coarse and fine open-work viscous sheeting) is that its fine media portion at the outlet zone quickly clogs on its front surfaces. This condition is similar to the dry screen-strainer front-surface clogging, first explained, because the coarse media at the inlet zone does not function as intended but actually allows a major percentage of the large size dust particles to reach and clog the fine media toward the outlet zone.

Thus the combination of the two media (coarse and fine viscous coated network) is not satisfactory, in respect to the power input required to operate the blowers of an air conditioning and distributing system, to the same unfavorable extent as first explained in connection with the dry screen-strainer sheet media and also has a short serviceable life. Such graduated-density viscous media is an attempt to improve upon the coarse open-work media and make it approach the maximum cleaning capacity of the dry screen-strainer fine media; but the over-all efficiency is a compromise of the two.

The foregoing three types of conventional filter media, as well as all others of which I am aware, collect and load with dust only on their front surfaces facing the oncoming dusty air stream. Thus conventional air filters are characterized by the limitation in service of retaining smug or agglomerate loaded only on the front surfaces and around the side edges of the media sheets which means that their serviceable life is spent even though still vitalized with viscous saturant on their rear surfaces where the air stream does not impinge the media.

Although never in commercial use, insofar as I am aware, there is another and possibly a fourth species of filter media (also a viscous type), as suggested in the patent art. It is made of expanded sheet metal and the material also is known as metal lath. It comprises flat sheets reticulated with open-work perforations (voids) of greater cumulative area than actual surface area. Expanded sheeting more generally has diamond-shaped openings and is formed of narrow vane surfaces set at an angle (inclined) to the plane of the flat sheet and hence at an angle to the direction of air flow through it. Under test, it likewise appears to have the disadvantage of front-surface air impingement only. Consequently, when made, as taught by the art, the expanded sheet media also collects and loads with dust only on its front surfaces—thus failing in efficiency because not utilizing its rear viscous surfaces. Such media has a short serviceable life.

In the foregoing, there is briefly explained some known types of filter media, the first mentioned being the dry type and the latter three being viscous coated types. In the present state of the art, the several species of media are characterized by front-surface impingement of the dusty air stream and hence do not utilize the viscous saturant on the rear surfaces. Representative known types of filters have been briefly explained in order to better understand and compare my new filter media with them. Accordingly, the problem solved by my invention will be more fully understood.

My invention is based on the discovery of ways and means to efficiently utilize expanded sheet material in the production of air filter viscous coated media and consists in an unusually simple means for achieving "rear-surface air impingement" and hence "rear-surface dust loading" in and on the media sheets. My new media is found to possess increased efficiency and a longer serviceable life than known types due to full utilization of the entire (100%) viscous surface area within the media depth.

As hereinafter demonstrated, this invention is based on a grouped arrangement of expanded sheets which cause "rear-surface" as well as "front-surface agglomerate loading." Consequently, my new filter arrests and holds approximately twice the amount of dust load as conventional filters and need not be removed from its air duct for servicing and cleaning with the frequency which characterizes conventional filters. There is no waste of the viscous saturant; the cost of servicing is greatly reduced; and the wear and tear on my filter panels due to service handling is at a minimum.

Research work in this field demonstrates that filters now in general use lack means for producing what may be called "rear-surface air turbulence" and consequently conventional filters do not catch and retain dust on their viscous rear surfaces, thus utilizing only about one-half of their available filter surface. By my new grouped arrangement of expanded sheets, I produce "rear-surface air turbulence and mixing," and thereby attain "rear-surface" as well as "front-surface loading." Thus I distinguish from conventional media which performs "front-surface loading" only—the latter being due to lack of a "mixing" action within the media. The improved difference in results which I achieve is of high order, and the change in structural arrangement over the prior art is one of marked simplicity.

Insofar as I am aware, the many improvements now in the field, as well as those suggested in the patent art, have not advanced the viscous air filter beyond "front-surface loading." The result is that conventional filter panels necessarily are removed from the ducts of air conditioning systems for servicing (cleaning and rewetting) before they have expended the entirety of their viscous coated surfaces—hence before they have expended their useful life—and they are subjected, therefore, to a great deal of wear and tear due to such handling operations.

Purposes of the invention

A main purpose is to produce a filter media which combines the advantages of two conventional types, namely, the dry screen-strainer fine-porosity sheet media of maximum air-cleaning capacity and the viscous coated coarse-porosity open-work sheet media of minimum resistance to the air flow, without having the disadvantages of either one of these old types as heretofore explained.

Accordingly, it is a purpose of the invention to disclose a wholly new principle and produce a new viscous media by employing expanded sheets which, individually, are so placed and newly arranged in relation to each other (according to my discovery) that "air turbulence and mixing" is produced in the rear as well as in front of the individual sheets, and which causes an "over-all surface impingement," thereby resulting in a new "rear-surface loading" of dust as well as conventional "front-surface loading" thereof.

Among other things, it is a purpose also to provide a filter media having surfaces so formed on contiguously packed viscous sheets of coarsely-expanded open-work material that the media acts upon a dusty air stream as a whole by dividing and redividing it into numerously diverging minute streamlets of laterally twisting and advancing centrifugal multiplex patterns, thus resulting in a novel "air mixing" function, and by which the dusty air streamlets, which first impinge the front surfaces of the media sheets in the old and usual way, also are caused to wipingly impinge and centrifuge along the rear media surfaces in a new and unusual way.

I propose, therefore, a dual-cleaning media, one which so operates on an air stream that the entrained dust is delivered to both front and rear viscous surfaces of the media sheets. Consequently, the passage of a dusty air stream through my new media, for example, of a one-inch depth, may be said to be the equivalent of passing through a conventional filter media of approximately two-inch depth.

The foregoing and other general purposes are to provide an air filtering viscous media of greatly increased dust holding capacity—one having a serviceable life of longer duration than conventional filters—a media of reduced depth, one which loads uniformly and "over-all" on the entirety of its dust arresting surfaces, and which is more adaptable to high-velocity air-flow ventilating systems.

*The drawings and media assembly in filter panel form*

The description herein and the accompanying drawings explain the principle of the invention, point out its main purposes, present it as preferred at this time, demonstrate its features in order to disclose the scope of the invention, thus suggesting further examples which may develop out of and occur to others from the teachings herein, and also aid in understanding the problems sought to be solved.

A conventional form of expanded sheeting having "diamond-shaped" coarsely-reticulated open-work is chosen for illustrating the invention. The "diamond" type perforated sheeting is one of the more suitable materials, but other conventional forms and perforation-shapes thereof may be used when following the principle of this invention.

Figs. 1 and 2 (on a reduced scale) are entirely diagrammatic and in general represent my new filter panel embodying grouped sheets of expanded material irrespective of perforation type and shape—showing the "Media pack as a whole."

On the other hand, Figs. 3 through 12 are mechanical drawings (full or even enlarged scale) of fragmentary portions of the "diamond-shaped" net-work expanded sheeting, constructed in groups of four, chosen to illustrate my new media—following which there is further illustration in diagrammatic and action-form to demonstrate the mode of operation which achieves "rear-surface media loading"—believed to be the first in the art with this construction and achievement.

Fig. 1 shows an elevation of my new "filter panel" comprising a "pack" of a dozen, more or less, of identical-form expanded media sheets. The structural form adapts this filter panel to be installed with either side thereof facing a dusty air stream to be cleaned. Thus Fig. 1 may be regarded as showing either the inlet or the outlet side of the media—hence the legend "Filter panel front or rear side."

Fig. 2 is a diagrammatic cross section on the line 2—2 and is intended to show an edgewise view of the dozen-sheet "Media pack as a whole" assembled into "filter panel" form.

Fig. 3 is a vertical section on the line 3—3 and is labelled "Side edge view." Fig. 4 is a plan section on the line 4—4 and is marked "Top edge view." Both are enlarged-scale mechanical drawings (edgewise elevations) of a popular make of diamond-pattern open-space sheeting and show, as labelled, a "Four sheet sub-unit of media"—hence a group of four sheets only of the filter panel (Figs. 1 and 2).

Figs. 5 through 8 are front face views of four individual diamond perforations (fragments of sheets) disposed in their four equal-angular positions relative to each other. The series of four sheets, constituting a media sub-unit, purposely is shown separately in order that the patent drawings may reserve room for the air direction arrows and legends. It is seen that the "Down" and "Left" as well as "Up" and "Right" arrows indicate the four changing directions of a dusty air stream dividing and diverging laterally through the series of four expanded diamond sheets.

Figure 10:
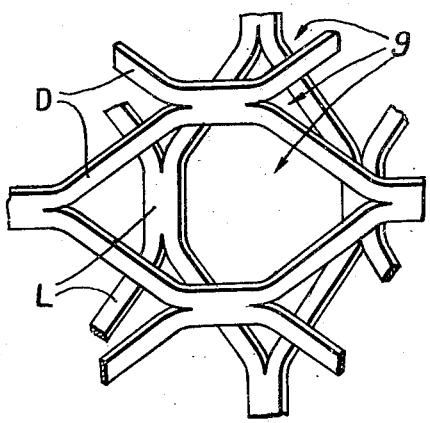
Figure 11:
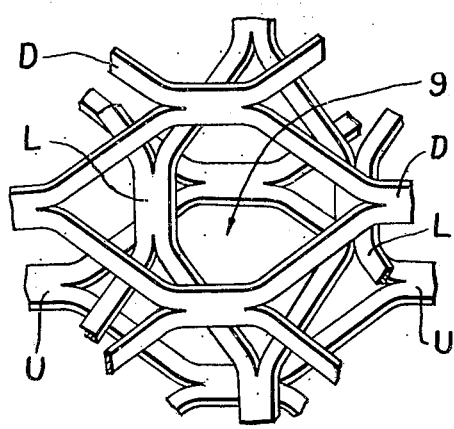
Figure 12:
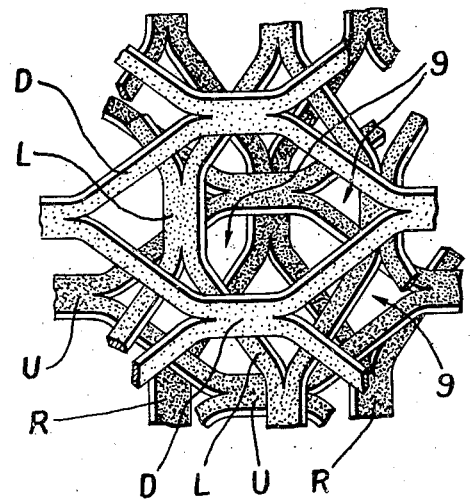

Figs. 9 through 12 are front face views, in succession, of one expanded sheet placed behind the other, in the same relative position as occupied in the previous four views, until a "Four sheet sub-unit of media" is assembled, as shown by the legend on Figs. 3, 4 and 12.

Figs. 13 and 14 are to be read together as a single action-diagram in an effort to graphically illustrate the function of one group of four expanded sheets which, temporarily, are spaced apart to make room for action-symbols. Note the legend—"Media sheets spaced to aid description, show air mixing, and rear-surface loading"—it being understood that the sheets are placed contiguously when assembled in "filter panel" form (Figs. 1 and 2).

Regarding the last-mentioned figures, the "Top edge view" and the "Side edge view" of the media sub-unit demonstrate a spirally turbulent air-mixing flow of dusty air stream travelling in a general twisting direction (say clockwise) through one group of four media sheets. The air stream is viewed perpendicular to its line of flow along a helical course.

Fig. 15 is an action-diagram labelled "Face view of four sheet sub-unit of media pack"—hence looking into one set of four viscous sheets (showing a fragment of each sheet) as viewed parallel to the line of air flow. This view supplements Figs. 13 and 14 in an effort to depict the air-mixing swirl which occurs within the depth of the media and achieves the "rear-surface loading," as heretofore in part explained, by applying a helical flow.

Referring particularly to Figs. 1 and 2, it is observed that a conventional frame 3 embraces the perimeter of my new filter "media pack 4" as a whole and grips it in assembled compact form to make a "filter panel 3, 4" of appropriate size. One standard form of filter panel in general use (made of conventional media) is about twenty inches (20") square. The sizes of filter panels in general use vary in accordance with the cross-sectional dimensions of a particular duct of an air distributing system (not shown) in which the panels are removably installed, and my new filter panel 3, 4 herein is dimension-formed to such standard practice.

As is customary, the retaining frame 3 is usually made of sheet steel. Likewise, the expanded sheets (next described) constituting the new filter media 4, may be made of any suitable material, usually of sheet metal. After the filter panel 3, 4 is assembled, it is spray or dip coated with a saturant, such as viscous liquid, usually a heavy oil, to wet the media; as is known in the art. The surplus liquid is allowed to drain off, and the new viscous filter panel 3, 4 is ready for installation in an air duct.

The depth or thickness (Fig. 2) of the new filter panel 3, 4 varies in accordance with the number of sheets contiguously laminated to make the media pack 4. For illustration purposes (Figs. 1 and 2), there are shown three groups of four identically-formed and coarsely-perforated flat sheet laminations, pointed out by reference letters D, L, U and R, gripped in tight relation, one sheet against the other, to prevent vibration, and to constitute the media pack assembly pointed to as a whole at 4. This dozen-sheet (more or less) media pack simply comprises a four-sheet group repeated or duplicated three times (Fig. 2) for producing the filter panel 3, 4 (as one example of commercial practice) about two inches in depth, more or less, depending upon the thickness of the individual media sheets.

The degree of air cleaning required, for a particular air conditioning system, determines the number of sub-unit groups of four sheets employed in the filter panel 3, 4 and hence is a factor which relates to the approximate depth of its media 4. The greater the dust load to be held between cleaning periods and the longer such periods, the deeper the media, and hence the greater the number of groups of coarsely-perforated open-space media sheets D, L, U and R which are used.

Beginning with Fig. 3, it will be seen that a description of the physical form of any one expanded viscous sheet, say the front sheet D, suffices for all. Its cumulative open-space area of air voids or perforations 9 is greatly in excess of its metallic-surface area composed of air-deflecting vanes which rim each hole 9. A typical media sheet may be about twenty-five percent (25%) actual surface area for dust arrestance and about seventy-five percent (75%) openwork hole area for air flow, this relationship being approximate and not critical; it may vary with different makes of the diamond-pattern sheeting. The narrow vanes D, L, U and R have an angular pitch inclined to the plane of the sheets, as is known in the art.

The foregoing demonstrates that the media pack (indicated as a whole at 4) is composed more largely of air-passage area (voids, perforations 9) than it is of viscous surface vanes D, L, etc. Thus the open-diamond pattern produces a media having coarse open-work air passages of "uniform density" throughout—differing materially from "graduated-density" media heretofore explained. It is for this reason (excessive hole area 9 combined with uniform density) that the media interposes a minimum of resistance to the flow of air through it. There is low resistance to air flow throughout the unusually long serviceable life of the new media which continues even to the end of such life when approaching maximum "over-all surface" dust loading.

An understanding of the foregoing makes it clear that if the cumulative inclined-surface area of the vaned sheets D, L, U and R is decreased (as by expanding larger size perforation areas 9 in the sheets) that the air flow resistance necessarily decreases. In contrast to this marked advantage (which may be availed of in following my discovery) conventional practice tends toward high-percentage viscous surface area in order to increase the dust arresting capacity. Such practice results in low-percentage open-space air passages with its inevitable resistance against the air flow and large increase of power consumption.

In contrast thereto, my invention is based upon a discovery which leads away from conventional practice and reverses the old form of low-percentage open-space air-passage area. The hole area 9 of my new media 4 is surprisingly large as compared to the dust-arresting inclined-surface area of the vanes D, L, U and R. Nevertheless, the percentage of dust extraction is high, and other factors are favorable.

*Compensating for the novel low-percentage viscous surface and comparison with conventional media*

One of the more important features of this invention comprises novel means to compensate the unusual low-percentage (25% more or less) inclined-vane-surface area D, L, U and R, which arrests and loads with dust, as compared with the high-percentage open-space area through which the air stream freely flows.

My compensating means puts this minimum area media to work in a new and effective manner. Its function is achieved in a simple way through my discovery that "mixing" of the dust-ladened air stream, within the body and depth of the media pack 4, compensates for the unusually small area of viscous surface and accomplishes the results which I have long sought. To provide such means, I simply dispose or orient each expanded sheet of inclined-surface vane area at an equal angle advanced along and helically around the flow-axis of the air stream in the same oriented angular direction. An understanding of the new function thusly derived is aided by comparison with the known action of conventional media, as next noted.

In many present day viscous filters of the sheet media type, the dusty air stream divides as it passes in a straight line through the fine screen wire and other forms of media and flows straight at and head-on against the next sheet where it also divides, and so on, successively, in a linear and parallel flow through the media. The air stream, therefore, merely and only gives up its dust at the points and lines of front-surface impingement where the air strikes against and divides around the perforated or wire mesh sheet surfaces. Thus it is seen that the divided air stream portions, which fail to make direct head-on front-surface impingement, do not give up their dust and consequently escape through the filter to mix with and contaminate the clean air. It follows, therefore, that the rear viscous surfaces of conventional media perform little or no useful work because of failure of the dusty air stream to impinge them.

In contrast to such straight-line head-on air flow through conventional filters having front-surface impingement only, my specially grouped arrangement of four media sheets in repeated units thereof operates to utilize the entirety of their minimum surface area composed of the angular guide vanes D, L, U and R which produce the novel air twisting and mixing function within the depth and body of my new media 4. These flat deflecting vanes in units of four re-divide and divert the dusty air stream laterally from its straight-line head-on flow and impart a serpentine twist having a swirling centrifugal mixing action within the media depth and function to produce both front and rear-surface impingement—hence both front and rear-surface loading.

Such new mode of operation not only compensates for the low-percentage area of viscous surfaces D, L, U and R, but more importantly achieves "air mixing inside the media." This is in striking contrast to conventional filters which permit the escape of dusty air to "subsequently mix" with and contaminate the clean air after leaving the filter.

Inasmuch as the invention relates to a new angular positioning arrangement of the successive sheets D, L, U and R, the drawings first show, in separated relation (Figs. 5 through 8), the four sheets of identical form oriented to four angular positions in order to emphasize my new discovery of the compensating and air mixing feature. This is observed by consecutive comparison of the four views, where the four sheets, in consecutive sequence, are disposed in four different equal-angular directions—illustrated here, by way of example, as being oriented or disposed at ninety degrees (90°) in relation to each other around and perpendicular to the normal direction of the air flow.

Taking any one of the four sheets, say the first (Fig. 5) marked D and its large perforation or air void marked 9, it is observed that said minimum-area interconnected network of viscous coated deflecting-vane surface D is pitched or inclined at an angle to the plane of the sheet as a whole. In other words, the surface D is inclined to the general direction or the axis of air flow perpendicular to or straight at and through the media sheet. A pitch of or within a range of between 20° to 40°, more or less, may be used but is not critical. This explanation of the angular inclination of the diamond surface of the front sheet D applies, of course, to the other expanded sheets L, U and R, etc., in the media pack 4 as a whole.

Now it is seen that the smaller the inclination, say 10° angle, in respect to the directional axis of the air flow (perpendicular to the plane of the media sheets), the less resistance the sheets offer, and, in proportion, the less is the rear-surface turbulent mixing. These and other factors constitute variables which are resolved when designing filter equipment for a particular installation presenting a set of given facts, as will be understood by those skilled in the art.

In addition to the inclination of the flat air-deflecting viscous vanes D, L, etc., explained next above, it is also pointed out that they are comparatively thin and narrow. The drawings show their approximate dimensioned relationship to the size of the large perforations 9. In some of the expanded sheeting satisfactorily used for this new air mixing media 4, the vane surfaces are about one-sixteenth ($\frac{1}{16}$) to one-eighth ($\frac{1}{8}$) inch wide; and the longest measurement across the irregularly or diamond shape perforations is about one-half ($\frac{1}{2}$) inch to one (1) inch. Such relations are variable and not critical, and choices are available in expanded sheeting of different makes.

In any event, it is seen that the width of the narrow vane surfaces D, L, etc., is less than the shortest distance across the large perforations 9. This provides a cumulative open area of air voids greatly in excess of the cumulative viscous surface area, a condition wholly unsuited to commercial filters unless compensated for by a means and operating mode which compels the free air within the perforations 9 to wipe the viscous surfaces.

Referring again to Figs. 5 through 8, and coming also to Figs. 9 through 12, it is observed that the identical-form viscous-media sheets D, L, U and R purposely are placed at right angles to each other about or around the axial direction of air flow perpendicular to the plane of the sheets. Thus the angular air-deflecting network of vanes comprising the first or front viscous coated sheet D break up, shred, divide and direct the air flow downward (as indicated by the legend and its arrows), the second angular sheet L repeats that action but directs the air to the left, while the third sheet U catches the air from the second sheet L and deflects it upwardly, and the fourth sheet R in sequence again shreds the air and deflects it to the right, thereby continuously redividing and swirling the air stream through one complete turn (360°).

Next, it is observed (Figs. 5 through 9) that the four-sheet four-direction group of lateral deflecting media sheets D, L, U and R necessarily are spread out and shown separately. But it is understood that the media sheets are stacked one against the other to first form a "Four sheet sub-unit of media 4" (Figs. 3, 4 and 12) and thereafter a plurality of such sub-units are assembled contiguously within the enclosing frame 3 (Fig. 2) for holding them in rigidly packed relation to produce the "Media pack 4 as a whole."

The final media pack 4 as a whole (Figs. 1 and 2) includes about three groups, more or less, of the four-direction four-sheet sets of media sheets D, L, U and R repeated in equal-angle arrangement of "Down, Left, Up and Right" (as in Figs. 5 through 8) until the filter panel 3, 4 of required thickness or depth is built up. Thus a twelve-sheet media pack 4 embodies air deflecting surface laminations so uniformly staggered and arranged that they subject the air flow to about three centrifugal mixing turns in passing through a filter panel built up with a media pack about two (2) inches thick.

Of importance is the fact that the uniformly equal-angle arrangement of the four-angular directions of the four-sheet group or sub-unit acts to prevent the open-work and surface lacing from meshing or registering, that is, prevents the vanes of one sheet from nesting down within the voids of the other. In this way, the uniformly angular advancing disposition of the engaging sheets assures that the contiguous edges of each angular air-deflecting vane bridges across the perforations 9 of each adjacent sheet and does not nest down within the perforations. This is an important feature which keeps the perforations free and open, thus contributing to the centrifugal turbulence and air mixing which I have discovered in respect to the four-sheet four-angular grouped arrangement constituting my invention.

In Fig. 12 the four media sheets D, L, U and R are contrasted by variant surface stippling in order to reveal the lines of each succeeding sheet as one is placed behind the other in the consecutive build-up demonstrated at Figs. 10 and 11. Each sheet is disposed clockwise 90° from the preceding sheet, in order that each successive angular air-deflecting surface be positioned at right angles to the other in a pattern of equal-angle symmetry. Now it is seen that the rear edge of each succeeding deflecting surface is irregularly disposed across the large open perforations 9 of each adjacent sheet—for this is a feature which aids in keeping the large voids or passages 9 open throughout the long serviceable life of the new media and contributes to minimum resistance to the air flow spiralling along a helical course.

The media sheets D, L, U and R, when stacked in equal-angle repetition to build up the media pack 4, form arbitrarily irregular air cell passages to keep open, against agglomerate clogging, the very large open-work hole area 9. The successive sheets are not matched to any particular hole 9 pattern when placing them in the 90° angle positions. This means that the assembly of the new media is simplified and that hole or perforation staggering is arbitrarily irregular in forming the open-work large passageways 9 through the depth of the media 4.

Manufacture of the viscous media pack 4 from standard expanded sheeting is facilitated by following the simple 90° angular pattern as herein presented—the making up of the media in sub-assembled sets of four sheets D, L, U and R to a sub-unit—and then stacking as many sub-units together as may be required for a particular filter panel 3, 4. Less than four sheets to a sub-unit, say three sheets only, upsets the equal-angle pattern of continuity by leaving a gap or break of 180° and thus reduces the air mixing and rear-surface loading function at that zone in the media. Consequently, the importance of the four-sheet sub-assembly in equal-angle arrangement is appreciated.

Conversely, more than four sheets to a sub-unit is not necessary, although coming within the scope of my invention. In fact, it is found that producing the media sub-units in sets of more than four sheets, in order to advance the angular relation on more frequent turns and on smaller angles than 90°, increases the manufacturing cost—for in the use of more than four sheets within a 360° turn, there is a certain amount of loss in time and sheet material in the handling, trimming and preparing the sheets for assembly of the sub-units on equal-angle continuity in accordance with the invention.

Difficulty is met with in illustrating this new media and more especially its mode of operation as regards its new function and the unusual action it impresses on a contaminated air stream passing therethrough. The following description, however, and its action-diagrams serve to portray the unusual action and the uniform rear-surface loading of my new viscous media of simple form.

*Description of novel operation of the centrifugal-action media by reference to Figs. 13 and 14*

This part of my description is made by viewing the action of the media from its top edge (Fig. 13) and also from its side edge (Fig. 14). Thus the flow of a dusty air stream 10 is observed from a position perpendicular to its direction of flow, where the contaminated wind stream 10 is blowing against and through the first expanded viscous sheet D and entering the inlet zone of the media. The arrows indicate the general direction as well as the four breaks or twists in direction, while the legends supplement the arrows to bring out the four equal-angle 90° break of the air flow—as at "down, left, up and right."

The two edgewise action-diagrams show the centrifugal mixing of a dusty air stream 10, 11, etc., passing through one four-sheet four-direction sub-unit as embodied in a complete filter panel 3, 4 (Fig. 2). In this plan of illustration (the viscous sheets being temporarily spread apart), it becomes possible to see and understand the "rear-surface loading" of dust and the formation of agglomerate within the media depth.

The four network sheets D, L, U and R purposely are shown separated on the patent drawing merely for clarity in connection with this topic of description. The temporary spaces on the drawing, between the four media sheets viewed edgewise, are marked 9 to indicate the large open-space area 9 of each sheet D, L, U and R. And the reference 9, furthermore, is placed at the right of the last sheet R to repeat the open area of the first and next sheet D of a second sub-unit (not shown), it being understood that a second sub-unit contiguously follows—repeats the first. This repetition of the viscous inclined-surface area is indicated (Fig. 2) by the two sets of four reference characters and the legend, to-wit, "D L U R, D L U R, repeat."

Note also that the vaned cross-hatching is applied here (Figs. 13 and 14) in a manner to follow the similar representation, symbolically (Fig. 2), of any type of expanded sheeting of the inclined-vane type. This alternate horizontal and angular cross-hatching indicates the uniformity of the "down, left, up and right" helical course geometrically evolved in the equal-angle advance by the 90° successive orientation of the four sheets to make a 360° turn.

By consideration of the description (especially the previous topic) of the viscous media in its preferred four-sheet and four equal-angle assembly arrangement, or by inspection of the new media in its commercial form, it will be found that each successive open-space 9 simultaneously receives several divided streamlets of air from several different lateral directions. This is especially true after the minute air streams have passed through the first three expanded sheets D, L and U at the inlet zone and have reached the last sheet R within the depth of the front sub-unit of the media pack 4. Accordingly, let Figs. 13 and 14 represent the front or inlet zone sub-unit of the filter panel 3, 4 (Figs. 1 and 2) facing the oncoming dusty air stream 10 (heavy stipple).

Manifestly, a condition of intense gyrating centrifugal air turbulence is produced within the peripheral confine or bounds of each large perforation 9 of each expanded sheet—maximum turbulence beginning more especially on or at the rear surface of the fourth sheet R since it has "depth" within the media. The result is that the many small and divergent redivided air streamlets strike each other from different directions to induce a mixing and lateral spreading and wiping of the rear viscous surfaces throughout the remaining depth of the media to dust load said rear surfaces. Accordingly, little if any of the dust-ladened air (which misses front-surface impingement) escapes the more important "rear-surface arrestance."

This single condition of air mixing turbulence, as taking place within one perforation 9, is infinitely amplified. This is due to the fact that each diamond open-space 9 is rimmed by a hexagonal surface disposed in six different planes. As a result of this labyrinthic multiplex of surfaces, and despite the large-area voids 9, which make for free air flow and prevent agglomerate clogging, it is found that the infinitely broken directions and the myriads of colliding cyclonic atmospheric centrifugal disturbances cause the entire dusty air stream to be swirled, twisted and mixed in serpentine patterns and to be gyrated into wiping and centrifuging contact with all viscous surfaces (front, rear and edges) of the media sheets D, L, U and R in their repeated arrangement.

Thus it is seen that the dusty air stream 10 enters the front sub-unit of the media (Figs. 13 and 14) and is sliced and deflected "down" by the first angular surface sheet D and spills forward into the perforations 9 of the second media sheet L. The considerable amount of dust initially entrained in the contaminated air stream 10 is indicated (heavy stipple) on the drawing. And at 11, the air stream has been partially cleaned (less stipple) by the first sheet D and blows onto the second sheet L. The sheet L again slices the partially-cleaned air stream 11 and redirects it as air stream 12 at an angle to the "left" onto the third sheet U.

Next, it is seen that the air stream, caught between the media sheets L and U within the perforation 9, has further lightened its dust load (light stipple) in zone 12. The third sheet U repeats the cleaning operation and redirects the air stream 13 (lighter stipple) at an "up" angle onto the sheet R which in turn directs the air to the "right." This completes one swirling cycle or a 360° turn and delivers the air stream 14 (lightest stipple) to the first sheet D of the next four-sheet group (Fig. 2) to "repeat," and so on, the same cyclonic and centrifugal mixing and cleaning action along the axis of flow.

Studying further the foregoing operation, a first air flow of uniform arrows 11*a*, in the first cleaning zone 11, shows little or no turbulence since the air flow from the first sheet D is merely diverted "down." However, the air turbulence in part begins after passing the second sheet L, as indicated by the thin-patch arrow swirl 12*a* in the zone 12. But having passed through three sheets, the turbulence and mixing action increases, as demonstrated by the dense arrow swirl 13*a* in zone 13, at which position (in the third perforation 9 between sheets U and R) the air stream has been twisted through 270° only. And finally, the multiplex dense arrow swirl 14*a* in the active cleaning zone 14 emphasizes that the air stream has been acted upon by four expanded sheets D, L, U and R and has attained a maximum centrifugally gyrating mixing turbulence at the end of its 360° swirl.

The irregular directions of the colliding streams shown by the multiplex dense arrow swirl 14*a* stresses the air and dust mixing action of the divided air streams colliding when spilling off the diamond-shaped perimeters of each perforation 9 into adjacent perforations of the next sheets—after being acted on by the fourth sheet R. The turbulent air swirl 14*a* is of maximum mixing intensity within the fourth zone 14 and so continues uniformly through the additional sets of "repeats" media sub-units (Fig. 2) to produce maximum and uniform "rear-surface loading."

The arrestance of dust from the air stream 10 and formation of agglomerate, within the free and open-work perforations 9 affording minimum resistance to the air flow, is also shown in these spread-apart action-diagrams (Figs. 13 and 14). The cleaning zones and mixing streams 11, 12, 13 and 14 are, therefore, again referred to for the purpose of graphically showing agglomerate build-up on the viscous media in the new and unusual manner herein disclosed.

Incidentally, it will be understood that front-surface impingement, and hence front loading with dust, begins on the very first sheet D at the front side of the media and continues in the usual and known way throughout the media depth. Thus it is seen that dust loading builds up agglomerate at 10*b*, 11*b*, etc., on the front surfaces of all the viscous sheets D, L, U and R of the media, and such action continues at 12*b* and 13*b* due to the air stream or streams first impinging the front surfaces thereof.

Now as to the more important aspect of the media and its new utility—that of agglomerate loading on the rear surfaces—it is again pointed out that the thin-patch arrow swirl 12*a* in the second air-stream zone 12 indicates minor turbulence without helpful mixing. Therefore, traces of agglomerate 12*c* at times may collect on the rear surface of the second sheet L—but with faint or no trace of agglomerate to speak of forming on the rear surface of the front sheet D of an inlet-zone sub-unit. However, a limited amount of air mixing begins in the third air-stream cleaning zone 13, as indicated by the dense arrow swirl 13*a*, and causes agglomerate 13*c* to load perceptibly on the rear side of the third sheet U, but not with such full efficiency as to expend its useful life when it is in an inlet-zone sub-unit of the media.

Finally, and in keeping with the purposes of the invention, the last viscous sheet R (even though a part of an inlet-zone of the media) loads at 14*c* to full depth due to the fact that the fourth cleaning zone 14 mixes the advancing air with maximum intensity. This unusual condition is emphasized by the multiplex dense arrow swirl 14*a*, since the air spins and centrifuges under the cumulative action of all four angular-vaned open-work sheets D, L, U and R which generates one helical turn.

Observing more closely the edgewise views (Figs. 13 and 14), it is apparent that the front agglomerate formation 13*b* and the rear agglomerate 14*c* have finally grown together on the fourth viscous sheet R. This condition ultimately is attained (near the end of the serviceable life) by the maximum efficiency of the four-sheet four angle dust-centrifuging action stemming from my method of dividing and diverting the air stream in numerous laterally-flowing streamlets which are spiralled along a helical course around the axis of the normal direction of flow through the media.

Next, it is noted (sheets L and U) that the front and rear agglomerate layers 11*b* and 12*c*, as well as at 12*b* and 13*c*, have not grown together on the second and third sheets. This is due to the fact that the action-diagrams (Figs. 13 and 14) are designed to demonstrate an inlet-zone sub-unit portion of a media pack, only the fourth sheet R of which attains maximum air-cleaning efficiency and agglomerate loading.

It will be understood, however, that the other sub-units of four-sheet media assemblies (see Fig. 2 as a whole) act to arrest dust and uniformly load to full depth, as at 14*c*, on all of the viscous sheets throughout the media pack 4 as a whole—beginning with the fifth sheet D thereof. Once the fourth sheet R is passed, all sheets function alike under the intense mixing and centrifuging action set up by the multiplex density of the air streams, as at 14*a*, laterally colliding along the numerous spiralling paths of the divided air streams.

Let 14a and 14c apply, therefore, with equal emphasis to all viscous sheets after the media depth is reached—which makes an exception of the first three sheets at the beginning of the inlet-zone side and the last single sheet at the outlet-zone side of the filter panel. Except for these four sheets, all others in the media depth act to uniformly swirl the air through a 360° turn and consequently experience a "uniformly equal" loading of agglomerate on their "rear surfaces."

It is pointed out that my discovery of uniform or equal-angle arrangement around a full 360° turn, obtained by the inclined-surface area of the open-space sheeting, results initially in a progressive loading of dust and ultimately in a uniform-agglomerate "front and rear-surface loading" within the media depth. Such full and equal loading makes for long-duration service runs and is due to the "uniformity" of the spirally-mixing air turbulence within all parts of the media depth. The air-guiding inclined-surface area (vanes) of the sheets, combined with the equal-angle oriented position of the successive sheets to produce the helical air flow around the axes of the countless lateralling and advancing air streamlets, makes for uniform centrifuging of the entrained dust evenly to all media surfaces. This prevents "gob or spot loading," that is, overloading in certain areas which, if occurs, inevitably "unloads" or lets go, under pressure of the air flow, to contaminate the clean air with a burst of agglomerate particles.

From the foregoing, it is appreciated that this topic is more particularly devoted to disclosing the media action by observing it perpendicular to the general direction or axis of air flow in order to show the "rear-surface loading" of agglomerate beginning fully and efficiently at 14c. The importance of such action, and the function of the multiplex dense air swirl 14a, within one or the countless numbers of open-work large voids 9, is ultimately appreciated by observing the action of this new media parallel to and on the axis of the air flow—as in the next topic.

*Novel operation by reference to Fig. 15*

This final diagram of the drawings takes up where the previous views (side edge observations) leave off, that is, after the air flow has passed through the last viscous sheet R (Figs. 13 and 14) and is turbulently gyrating at maximum intensity at 14a. Thus Fig. 15 graphically demonstrates the cleaning action by observing a head-on or a front face view of the media pack 4 (axial flow observation) as here shown.

In effect, Fig. 15 takes the face view (Fig. 12) and spreads out fragments of its four sheets D, L, U and R, on the equal 90° angle placement around the axis of the air-stream zone 14, and pictures as well as possible one large void 9 bounding one of the multiplex dense air swirls 14a. Previous reference characters are employed in this topic where appropriate, but new reference numbers now are necessarily required to point out additional symbols representing actions and diverted air flow visualized only in Fig. 15.

Thus in the final diagram, the air stream 14 (represented by the heavy arrow band) has reached the media depth by having passed through the first four sheets of the inlet-zone sub-unit (Figs. 13 and 14). Said stream 14 strikes and glances off successively, from and is redivided by the four network sheets and gyrates amidst the inclined-surface viscous areas shown in fragmentary form at D, L, U and R. Arrow clusters at 16, 17, 18 and 19 serve to illustrate the body of the entering air stream 14 being sliced-up and laterally spiralled and wiped off the inclined surfaces of the four media sheets toward and into the center of the perforation 9 which is, of course, the large open area on the drawing bounded by the four fragments of the media sheets.

By studying the multiplex angular relations of the media sheets (see the mechanical drawings, Figs. 3 through 12), it will be understood that the working-surface perimeter of a diamond-shaped opening 9 is defined by at least four sides, all of which are pitched at about the same angle in respect to the axis of general direction of the air flow perpendicular to the plane of the media sheets, and that said four sides are in different angular planes with respect to each other. It follows, therefore, that a single diamond-shaped surface acts to shred a single air stream into at least four swirls of air strata having four different directions and which are colliding with other shredded streams divided by other and adjacent diamond-shaped media vanes.

The unusual next-above described characteristic results from my equal-angle advancing repetition of the viscous media sheets placed at 90° in relation to each other around the axis of the dusty air flow and is the feature of my discovery of just how to make this new filter media load uniformly within its depth. Said uniformity of agglomerate loading (evenness in dirt deposit) constitutes a high order of advance and a long step forward in air filtration by wet media because of the numerous favorable factors which result therefrom.

To continue, it will be observed that the air stream 14 (Fig. 15) is deflected in a mixed swirl of one complete turn (as clockwise) while advancing through four media sheets D, L, U and R. The multiplex of air streams collide with each other from four different directions into the tortuous cellular openings formed by the staggered relation of the numerously repeated large perforations 9. Such action seems to bring the air mixing swirl to the center of the perforation 9, as symbolized by the multiplex dense arrow swirl 14a representing the resultant "mixing turbulent pressure" of the four air streams 16, 17, 18 and 19 colliding and merging under pressure at 14a.

Again, the air stream—the long heavy twisting arrow band 14—must be viewed as indicating the general direction of the advancing four bodies of air 16, 17, 18 and 19 and the resultant mixing cyclonic swirl 14a. The mixing swirl 14a laterally mushrooms outwardly within the media pack 4 and wipes all viscous surfaces as it advances along its spiral course.

Concerning the air "mixing" function at 14a, and what it accomplishes by laterally gyrating and spreading in a mushrooming fashion within the depth of the media pack 4, it is found that this phenomena is a direct cause in achieving favorable results. Apparently, the air mixing action follows this sequence—each viscous sheet of air deflectors D, L, U and R absorbs and arrests a portion of the entrained dust, whereupon that portion of dust not absorbed by the front or rear surface of the preceding sheet is "mixed" by the next media sheet with that portion of air which was cleaned by the previous sheet.

The mixing is continuous and the impinged clean air merges with the unimpinged dusty air, thereby maintaining a homogeneous air-mass mixture flowing through the media. The spiralling and mixing action, as will be understood by studying the side views (Figs. 3, 4, 13 and 14) as well as the face views (Figs. 12 and 15), is so intense as to prevent the escape of unimpinged air stream portions from the discharge side of the media pack 4. The foregoing action-study made of Figs. 13 through 15 brings me to another feature of this new media not yet compared with conventional practice.

The inefficiency of conventional media, in its lack of rear-surface arrestance and agglomerate loading (aside from its lack of a "mixing" function), appears to be due to the fact that the kinetic energy and inertia of the flowing dust particles carries them by the low-pressure areas induced at the rear surfaces by air pressure on the front and along the sides of screen wire and other media sheeting, thus preventing impingement of said rear surfaces of present day media. But in my new media, the centrifugal mixing action, at the rear and within the viscous sheets D, L, U and R, carries the air streamlets and entrained dust laterally along the rear surfaces of the expanded sheets—with a facility equal to the action on the front surfaces thereof—due to my method of employing centrifugal force to "hurl" the dust particles onto the rear viscous surfaces.

In long uninterrupted runs of this new filter, without cleaning, it is found that any agglomerate accumulation, which tends to pack up and bridge across the open-space areas 9, and which in time becomes dislodged by pressure of the air stream, is more certain of rearrestance and reabsorption into the growing agglomerate mass than in conventional media. The rearrestance of dislodged agglomerate particles is augmented by the turbulent spinning and mixing action of the air streamlets which picks up, pulverizes and remixes a "burst" of agglomerate and "resprays" it "centrifugally" by bombarding the rear and front surfaces of the successive media sheets with the disbursed particles. This is a new function.

It is found that dust and other foreign matter is extracted from the air by my new openwork coarse (low-percentage surface area) media of the wet type with a thoroughness comparable to the action of the conventional screen-strainer fine-porosity (high-percentage surface area) media of the dry type first referred to herein. And my media accomplishes this without and entirely free of the premature front-surface clogging, the high resistance to air flow, and the need for frequent servicing, all of which characterize the several types of fine-porosity media.

*Summary of the new features*

It is believed apparent that this new combination of features, together with the method practiced, provides the unusual mode of operation herein disclosed, leads to the unexpected results achieved, and constitutes an innovation in this field.

The low-percentage surface area of my media (making for sustained free air flow and a more constantly favorable power factor) is compensated by the angular inclination of the expanded-sheet air-deflecting vanes and performs comparably with media of high-percentage surface area—the inclination of the vanes in turn performing the added function of rear-surface loading.

Then also, the uniform advance or oriented positions of the expanded sheets of interconnected network, in sub-units of four, at a constant or equal angle for each sheet, around the axis of air flow, provides for equal distribution of the dust to the individual sheets within the media depth, that is, uniform loading, and avoids overloading of agglomerate in certain zones of the media and underloading in others. Since this uniformity applies to both "front and rear-surface loading," it follows that my media holds a larger dust load by volume and weight than is usual in the field. The new filter panel, therefore, requires less handling and servicing; consequently it remains in better mechanical condition free of wear and tear.

Finally, it is pointed out that the principle of the invention herein is the same when employing expanded sheeting other than the diamond-shaped form which I have featured as being one of if not the most suitable type. In other words, it will be understood that any type of expanded sheeting (which has inclined vane surfaces) will assemble contiguously and yet provide the open-work passages within and through which a dusty air stream is continuously redivided and diverted off its straight-line course and into a laterally guided redirection for simultaneously spiralling and mixing as it advances through and uniformly loads on all surfaces of the media.

Where the diamond type expanded sheeting is employed as herein, it is usually found that its hexagonal pattern provides a major and minor axis. In other words, the uniform hexagonal inclined vanes bound an open space longer in one direction than another. When, therefore, the sheets are set successively, one behind another, at an angle of 90° or any other suitable angle, it simply means that one of the axes of the diamond pattern is disposed at that chosen angle. In other words, the vanes per se of several sheets are not uniformly disposed at such chosen angle because they irregularly traverse each other, but it is a given axis of a sheet or of the diamond open spaces which constitutes a reference for relatively disposing the expanded sheets at an angle to each other around and along the normal direction of an air stream through the media. This and other factors are made clear by further reference to the drawings and description.

The disclosure herein explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful air filtering media. Since various modifications in construction, mode of operation, use and method, may and often do occur to others skilled in the art after acquaintance with a particular invention, it is to be understood that this disclosure is exemplary of the principles and of equivalent constructions without being limited to the present showing of the invention.

What is claimed is:

1. An air filter media comprising expanded sheets packed in filter panel form, each sheet consisting of a network of interconnected vanes coated on all surfaces with a viscous liquid, and having greater open-space area for the flow of a dusty air stream therethrough than viscous-surface area for dust arrestance and dust loading thereon, the viscous surfaces of said vanes in each sheet being inclined in the same direction to the plane of the sheet, with each successive sheet disposed in an oriented angular relation to the preceding sheet, at least four of said sheets being embodied as a group in the filter media, the successive orientation of the sheets of said group providing a 360° rotation of the air in passing therethru, whereby the dusty air stream entering the filter is divided and redivided into a multiplicity of small streams which are deflected laterally and guided forwardly with a turbulent mixing action along a helical course through the media, by which dust arrestance and loading as aforesaid is effected centrifugally on the rear as well as the front viscous surfaces of the sheets.

2. An air filter media as described in claim 1, and wherein the "angular relation" therein specified is the same for each successive sheet in the group.

3. An air filter media as described in claim 1, and wherein the "angular relation" therein specified is substantially at right angles, thereby disposing each successive sheet at a 90° angle to the preceding sheet in the group.

CORTLAND N. O'DAY.

REFERENCES CITED

The following references are of record in the file of this patent:

UNITED STATES PATENTS

| Number | Name | Date |
| --- | --- | --- |
| 2,037,164 | Harrah | Apr. 14, 1936 |

FOREIGN PATENTS

| Number | Country | Date |
| --- | --- | --- |
| 253,606 | Great Britain | June 21, 1926 |
| 309,855 | Germany | Dec. 18, 1918 |
| 835,982 | France | Oct. 3, 1938 |